(12) United States Patent
Sun et al.

(10) Patent No.: US 8,081,552 B2
(45) Date of Patent: Dec. 20, 2011

(54) HOLOGRAM DISC READING AND WRITING APPARATUS AND HOLOGRAM DISC READING APPARATUS

(75) Inventors: Ching-Cherng Sun, Taoyuan County (TW); Yeh-Wei Yu, Hsinchu County (TW); Che-Chih Hsu, Kaohsiung (TW); Tun-Chien Teng, Hsinchu (TW); Cheng-Hsien Chen, Chiayi (TW)

(73) Assignee: National Central University, Taoyuan (TW)

( * ) Notice: Subject to any disclaimer, the term of this patent is extended or adjusted under 35 U.S.C. 154(b) by 72 days.

(21) Appl. No.: 12/618,785

(22) Filed: Nov. 16, 2009

(65) Prior Publication Data
US 2010/0309768 A1    Dec. 9, 2010

(30) Foreign Application Priority Data
Jun. 6, 2009   (TW) ................................ 98118899 A (51) Int. Cl.
*G11B 7/00*   (2006.01)
(52) U.S. Cl. .......... 369/103; 365/215; 365/234; 359/15; 359/29
(58) Field of Classification Search .................. 369/103; 359/15, 29; 365/215, 234
See application file for complete search history.

(56) References Cited

U.S. PATENT DOCUMENTS

| | | | |
|---|---|---|---|
| 5,519,651 A * | 5/1996 | Redfield | 365/125 |
| 6,317,404 B1 * | 11/2001 | Kawano et al. | 369/103 |
| 6,538,776 B2 | 3/2003 | Edwards | |
| 6,721,076 B2 | 4/2004 | King et al. | |
| 7,388,695 B2 | 6/2008 | Lawrence et al. | |
| 7,606,133 B2 * | 10/2009 | Fukumoto et al. | 369/103 |
| 2002/0101629 A1 | 8/2002 | Suganuma | |
| 2002/0154589 A1 * | 10/2002 | Tanaka et al. | 369/103 |
| 2003/0002424 A1 * | 1/2003 | Temple | 369/103 |
| 2003/0039001 A1 | 2/2003 | King et al. | |
| 2008/0117788 A1 * | 5/2008 | Kasazumi et al. | 369/103 |
| 2008/0170486 A1 * | 7/2008 | Sato et al. | 369/112.05 |

OTHER PUBLICATIONS

Article Titled "Shift mutiplexing with spherical reference wave", jointly authored by G. Barbastathis et al., in Appl. Opt. 35, 1996, pp. 2403-2417.

* cited by examiner

*Primary Examiner* — Wayne Young
*Assistant Examiner* — Linh Nguyen
(74) *Attorney, Agent, or Firm* — Jianq Chyun IP Office (57) ABSTRACT

A hologram disc reading and writing apparatus including a signal light source module, a beam splitter, a reference/reading light source, a reflector, and an optical reading head and a hologram disc reading apparatus are provided. A signal light beam emitted from the signal light source module is transmitted to a data region of a hologram disc through the beam splitter. The reference/reading light source, the signal light source module, and the optical reading head are disposed at the same side of the hologram disc. The reflector is disposed at the other side. A spherical wave light beam emitted from the reference/reading light source is transmitted through the data region and reflected by the reflector to form a phase conjugate light beam transmitted to and through the data region. The phase conjugate light beam is transformed to a data light beam transmitted to the optical reading head through the beam splitter.

26 Claims, 13 Drawing Sheets

HOLOGRAM DISC READING AND WRITING APPARATUS AND HOLOGRAM DISC READING APPARATUS

CROSS-REFERENCE TO RELATED APPLICATION

This application claims the priority benefit of Taiwan application serial no. 98118899, filed Jun. 6, 2009. The entirety of the above-mentioned patent application is hereby incorporated by reference herein and made a part of specification.

BACKGROUND OF THE INVENTION

1. Field of the Invention

The present invention is related to a disc drive, and more particularly, to a hologram disc reading and writing apparatus and a hologram disc reading apparatus.

2. Description of Related Art

With the recent progress of storage technology, discs have the advantages of large storage capacity, easy and secure storage of data, long storage term, low costs, and so on, and a user is capable of easily using a disc drive to read the data stored in the disc. Generally, the reading and writing method of a disc is to focus a laser beam on the disc through an objective lens to perform the reading and writing operation, and the storage capacity of the disc is decided by the area of the disc. To further enhance the storage capacity of the discs without changing the area of the discs, the recording density of the discs must be increased, or the wavelength of the laser beam must be shortened. However, owing to physical restrictions including diffraction limit, researchers aiming at increasing the storage capacity of the discs are facing a technological bottleneck.

For resolving the above problem, a hologram disc and a near-field disc to which the hologram technology and the near-field optic technology are applied are provided to significantly increase the storage capacity thereof. Since the storage capacity of the hologram discs can be more than 1 tera bytes (TB), and the reading speed can be more than 100 mega bytes (MB) per second, the combined mechanism of the hologram discs and a hologram disc reading and writing apparatus becomes the most promising storage medium.

Figure 1A:
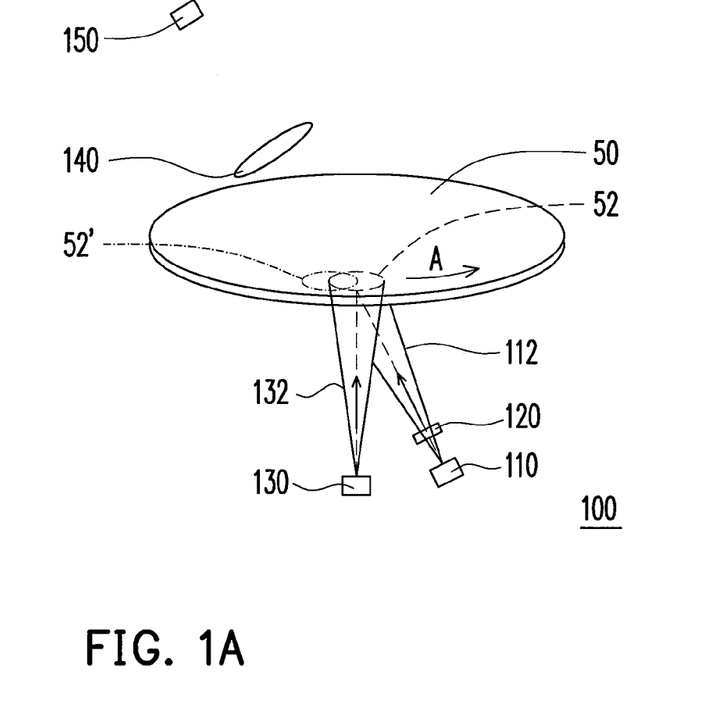
FIGS. 1A and 1B are schematic diagrams of a conventional hologram disc reading and writing apparatus when writing data and reading data, respectively.
Figure 1B:
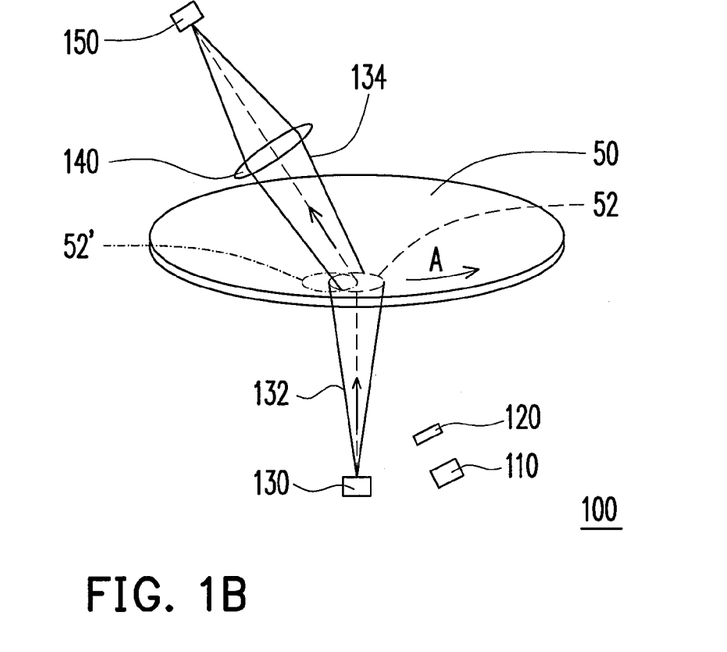

FIGS. 1A and 1B are schematic diagrams of a conventional hologram disc reading and writing apparatus when writing data and reading data respectively. Referring to FIGS. 1A and 1B, a conventional hologram disc reading and writing apparatus 100 is adapted for recording data on a hologram disc 50. The hologram disc reading and writing apparatus 100 includes a signal light source 110, a liquid crystal panel 120, a reference/reading light source 130, a focusing lens 140, and a charge coupled device (CCD) 150. In a process of writing data, the signal light source 110 and the reference/reading light source 130 of the hologram disc reading and writing apparatus 100 respectively emit a signal light beam 112 and a spherical wave light beam 132 coherent with the signal light beam 112 to a data region 52 of the hologram disc 50, and the signal light beam 112 and the spherical wave light beam 132 are interfered mutually in the data region 52, such that the data are recorded in the data region 52 in the form of interference gratings. In a process of reading data, the reference/reading light source 130 emits the spherical wave light beam 132 to the data region 52 of the hologram disc 50, wherein the spherical wave light beam 132 is transformed into a data light beam 134 carrying the data after passing through the data region 52 of the hologram disc 50. The data light beam 134 is focused on the CCD 150 after passing through the focusing lens 140, and the CCD 150 transforms the data light beam 134 into an electric signal.

When the hologram disc reading and writing apparatus 100 writes data, the signal light beam 112 and the spherical wave light beam 132 together form another set of interference gratings on another data region 52' while the hologram disc 50 rotates along a rotating direction A so as to let the data region 52' partially overlapped with the data region 52 move to an area where the signal light beam 112 and the spherical wave light beam 132 both irradiate. Although the distribution areas of the two sets of interference gratings corresponding to the data region 52 and the data region 52' respectively are partially overlapped, when the hologram disc reading and writing apparatus 100 reads data, the data recorded in the data region 52 (or the data region 52') can be carried by the data light beam 134 only if the data region 52 (or the data region 52') is completely located inside the area where the signal light beam 112 and the spherical wave light beam 132 both irradiate. In other words, in the hologram disc 50, data regions respectively recording different data can be partially overlapped, and thus the hologram disc reading and writing apparatus 100 can create large storage capacity in the restricted volume of the discs, which refers to the so-called spherical wave shifting multiplexing.

Nevertheless, the CCD 150 and the light sources (e.g. the reference/reading light source 130 and the signal light source 110) of the hologram disc reading and writing apparatus 100 are located at two opposite sides of the hologram disc 50 respectively, and this layout requires relative large space. Therefore, the volume of the hologram disc reading and writing apparatus 100 cannot be reduced, and the hologram disc reading and writing apparatus 100 is then not able to be applied in the portable electronic products with small size.

SUMMARY OF THE INVENTION

The present invention relates to a hologram disc reading and writing apparatus, and the volume of the hologram disc reading and writing apparatus can be reduced effectively.

The present invention relates to a hologram disc reading apparatus, and the volume of the hologram disc reading apparatus can be reduced effectively.

The present invention provides a hologram disc reading and writing apparatus for reading and writing data on a hologram disc. The hologram disc reading and writing apparatus includes a signal light source module, a beam splitter, a reference/reading light source, a reflector, and an optical reading head. The signal light source module is adapted for emitting a signal light beam to a data region of the hologram disc when writing data, and the signal light beam has a first polarization direction. The beam splitter is disposed on a transmission path of the signal light beam and located between the signal light source module and the data region, and the beam splitter is adapted for transmitting the signal light beam to the data region. The reference/reading light source and the signal light source module are located at the same side of the hologram disc, and the reference/reading light source is adapted for emitting a spherical wave light beam having the first polarization direction to the data region when writing data so as to write data into the data region by using the signal light beam and the spherical wave light beam. The reference/reading light source is also adapted for emitting the spherical wave light beam to the data region when reading data, and the spherical wave light beam passes through the data region. The reflector and the reference/reading light source are respectively located at two opposite sides of the hologram disc. The reflector is adapted for reflecting the spherical wave light beam to form a phase conjugate light beam conjugating with the spherical wave light beam and transmitted to the data region, and the phase conjugate light beam passes through the data region and is then transformed to a data light beam to be transmitted to the beam splitter. The optical reading head and the reference/reading light source are located at the same side of the hologram disc, and the beam splitter is adapted for transmitting the data light beam to the optical reading head.

In an embodiment of the present invention, the signal light source module may include a signal light source and a spatial light modulator. The signal light source is used for emitting the signal light beam. The spatial light modulator is disposed on the transmission path of the signal light beam for modulating the signal light beam. The spatial light modulator is, for example, a liquid crystal panel or a digital micro-mirror device.

In an embodiment of the present invention, the hologram disc reading and writing apparatus further includes a lens disposed on the transmission path of the signal light beam and located between the signal light source and the spatial light modulator.

In an embodiment of the present invention, the signal light beam and the spherical wave light beam can be coherent.

In an embodiment of the present invention, the spherical wave light beam can be a divergent light beam.

In an embodiment of the present invention, the beam splitter has a splitter surface. The signal light beam is reflected to the data region by the splitter surface, and the data light beam passes through the splitter surface and is transmitted to the optical reading head.

In an embodiment of the present invention, the signal light beam can pass through the splitter surface and is transmitted to the data region, and the data light beam can be reflected to the optical reading head by the beam splitter.

In an embodiment of the present invention, the beam splitter is a partially-transmissive-partially-reflective mirror or a total internal reflection prism (TIR prism).

In an embodiment of the present invention, the beam splitter is a polarized beam splitter, and the hologram disc reading and writing apparatus further includes a quarter wavelength retarder disposed in the transmission path of the phase conjugate light beam and located between the reflector and the data region, wherein the phase conjugate light beam has a second polarization direction after passing through the quarter wavelength retarder, and the data light beam also has the second polarization direction.

In an embodiment of the present invention, the first polarization direction is substantially perpendicular to the second polarization direction.

In an embodiment of the present invention, the signal light source module and the beam splitter can be disposed at a position where the signal light beam is substantially perpendicularly incident to the data region, and the reference/reading light source can be disposed at a position where the spherical wave light beam is obliquely incident to the data region.

In an embodiment of the present invention, the signal light source module and the beam splitter can be disposed at a position where the signal light beam is obliquely incident to the data region, and the reference/reading light source can be disposed at a position where the spherical wave light beam is substantially perpendicularly incident to the data region.

In an embodiment of the present invention, the reflector can be a concave mirror which has a curvature center located at a divergent canter of the spherical wave light beam.

In an embodiment of the present invention, the hologram disc reading and writing apparatus can further include a lens disposed on the transmission path of the phase conjugate light beam and located between the reflector and the data region, and in the meantime, the reflector can be a flat mirror.

In an embodiment of the present invention, the hologram disc reading and writing apparatus further includes a lens disposed on the transmission path of the signal light beam and located between the beam splitter and the data region.

In an embodiment of the present invention, the optical reading head can include a charge coupled device or a complementary metal-oxide-semiconductor sensor for transforming the data light beam into an electric signal.

The present invention further provides a hologram disc reading apparatus for reading data on a hologram disc. The hologram disc reading apparatus includes the same reflector and the same optical reading head as those of the above hologram disc reading and writing apparatus, and the hologram disc reading apparatus further includes a reading light source consistent with the above reference/reading light source, wherein the locations of the reading light source, the reflector and the optical reading head are similar to those of the above hologram disc reading and writing apparatus.

In view of the above, the hologram disc reading and writing apparatus and the hologram disc reading apparatus of the present invention adopt the phase conjugate light readout design to dispose the optical reading head and the light sources at the same side of the hologram disc. Said disposition manner is conducive to reduction of the volume of the hologram disc reading and writing apparatus and the volume of the hologram disc reading apparatus.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention.

DESCRIPTION OF EMBODIMENTS

Figure 2A:
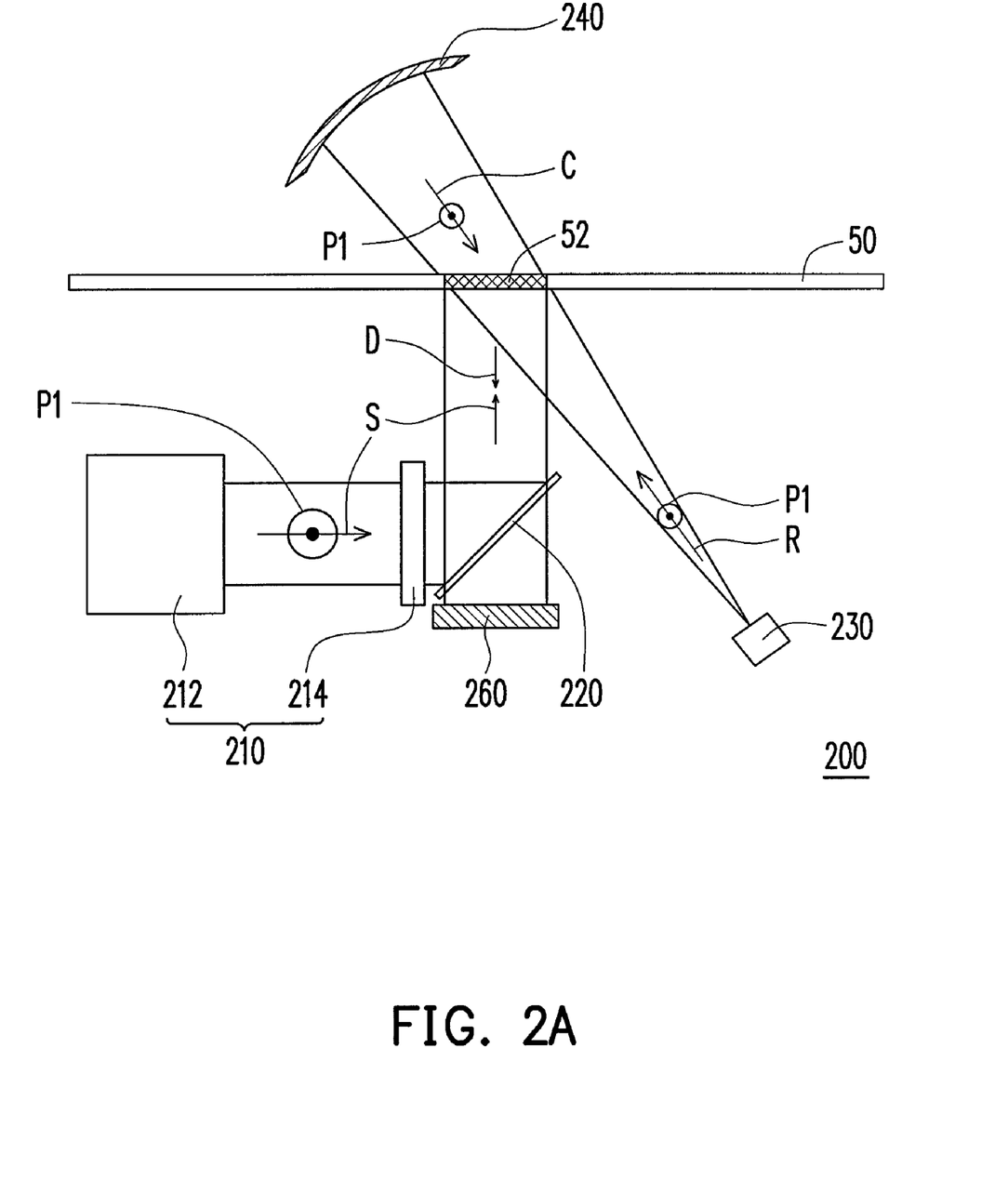
FIG. 2A is a schematic diagram of a hologram disc reading and writing apparatus according to an embodiment of the present invention.

FIG. 2A is a schematic diagram of a hologram disc reading and writing apparatus according to an embodiment of the present invention. In FIG. 2A, a hologram disc reading and writing apparatus 200 of the present embodiment is used for reading and writing data on a hologram disc 50, wherein the hologram disc 50 includes a photosensitive material and can have a round disc shape, a rectangular parallelepiped shaped, or other shapes. The hologram disc reading and writing apparatus 200 includes a signal light source module 210, a beam splitter 220, a reference/reading light source 230, a reflector 240, and an optical reading head 260. The signal light source module 210 is adapted for emitting a signal light beam S to a data region 52 of the hologram disc 50 when writing data, and the signal light beam S has a first polarization direction P1. The beam splitter 220 is disposed on the transmission path of the signal light beam S and located between the signal light source module 210 and the data region 52. The beam splitter 220 is adapted for transmitting the signal light beam S to the data region 52. The reference/reading light source 230 and the signal light source module 210 are located at the same side of the hologram disc 50. The reference/reading light source 230 is adapted for emitting a spherical wave light beam R to the data region 52 when writing data, wherein the spherical wave light beam R and the signal light beam S are coherent and have the same polarization direction. An interference effect between the signal light beam S and the spherical wave light beam R is generated at the data region 52 so as to record the data in the data region 52 in form of interference gratings. The reference/reading light source 230 is also adapted for emitting the spherical wave light beam R to the data region 52 when reading data, and the spherical wave light beam R passes through the data region 52. The reflector 240 and the reference/reading light source 230 are respectively located at two opposite sides of the hologram disc 50. The reflector 240 is adapted for reflecting the spherical wave light beam R to form a phase conjugate light beam C which conjugates with the spherical wave light beam R and is transmitted to the data region 52. The phase conjugate light beam C passes through the data region 52 and is then transformed into a data light beam D to be transmitted to the beam splitter 220, wherein the data light beam D carries the data recorded in the data region 52. The optical reading head 260 and the reference/reading light source 230 are located at the same side of the hologram disc 50, and the beam splitter 220 is adapted for transmitting the data light beam D to the optical reading head 260. It is noted that the first polarization direction P1 can be any proper direction in the present embodiment, while the direction illustrated in FIG. 2A is perpendicular to the drawing sheet and is merely an example.

The hologram disc reading and writing apparatus 200 of the present embodiment adopts the design combining the spherical wave shifting multiplexing and the phase conjugate light readout so as to dispose the optical reading head 260 and the light sources (e.g. the signal light source module 210 and the reference/reading light source 230) at the same side of the hologram disc 50. The disposition manner is conducive to reduction the volume of the hologram disc reading and writing apparatus 200 and allows application of the hologram disc reading and writing apparatus 200 to in the portable electronic products with small volume.

Figure 2B:
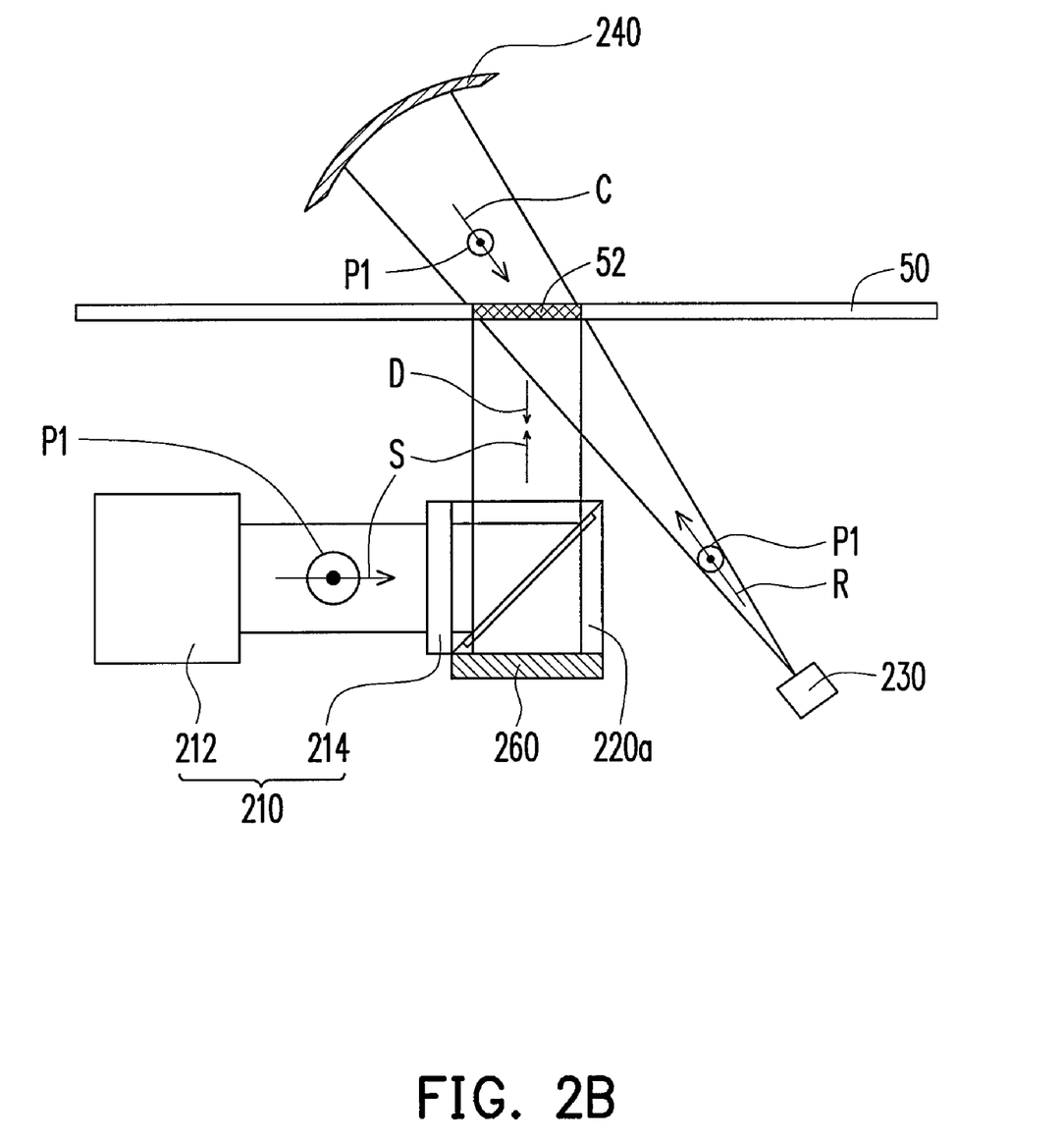
FIG. 2B shows modifications made to the hologram disc reading and writing apparatus depicted in FIG. 2A.

In the present embodiment, the signal light source module 210 can include a signal light source 212 and a spatial light modulator 214. The signal light source 212 is used for emitting the signal light beam S. The spatial light modulator 214 is disposed on the transmission path of the signal light beam S for modulating the signal light beam S. The spatial light modulator 214 is, for example, a liquid crystal panel or a digital micro-mirror device. In addition, the optical reading head 260 can include a charge coupled device or a complementary metal-oxide-semiconductor sensor for transforming the data light beam D into an electric signal. In the present embodiment, the beam splitter 220 can be a partially-transmissive-partially-reflective mirror. Alternatively, in another embodiment as shown in FIG. 2B, the beam splitter 220a can be a total internal reflection prism (TIR prism).

Figure 3:
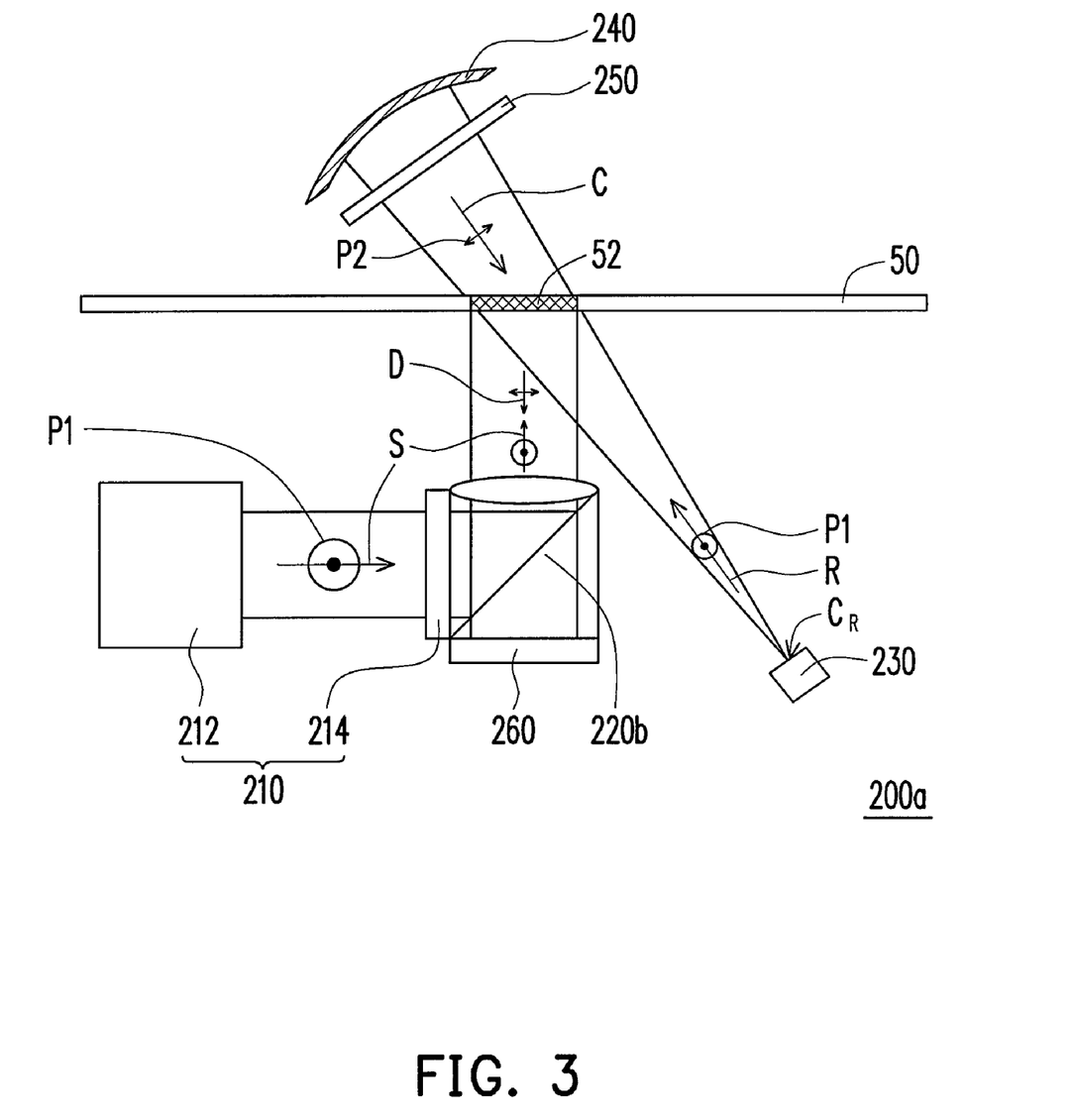
FIG. 3 is a schematic diagram of a hologram disc reading and writing apparatus according to another embodiment of the present invention.

FIG. 3 is a schematic diagram of a hologram disc reading and writing apparatus according to another embodiment of the present invention. In FIG. 3, the hologram disc reading and writing apparatus 200a of the present embodiment is similar to the above hologram disc reading and writing apparatus 200 shown in FIG. 2A, while the differences therebetween lie in that the beam splitter 220b of the present embodiment is a polarized beam splitter, and the hologram disc reading and writing apparatus 200a of the present embodiment further includes a quarter wavelength retarder 250. The quarter wavelength retarder 250 is disposed on the transmission path of the phase conjugate light beam C and located between the reflector 240 and the data region 52. The polarization direction of the phase conjugate light beam C is transformed into a second polarization direction P2 after the phase conjugate light beam C passes through the quarter wavelength retarder 250, and the data light beam D also has the second polarization direction P2.

Since the beam splitter 220b is a polarized beam splitter, the splitter effect thereof is superior to that of the beam splitter 220a, i.e. the partially-transmissive-partially-reflective mirror, and thus the interference gratings generated on the hologram disc 50 by the hologram disc reading and writing apparatus 200a of the present embodiment is much clear, and noises of the data light beam D in the present embodiment can be reduced accordingly.

Some modifications made to the hologram disc reading and writing apparatus 200a of the present embodiment are introduced below, and the modifications can be applied to the above hologram disc reading and writing apparatus 200 in FIG. 2A as well.

Figure 4A:
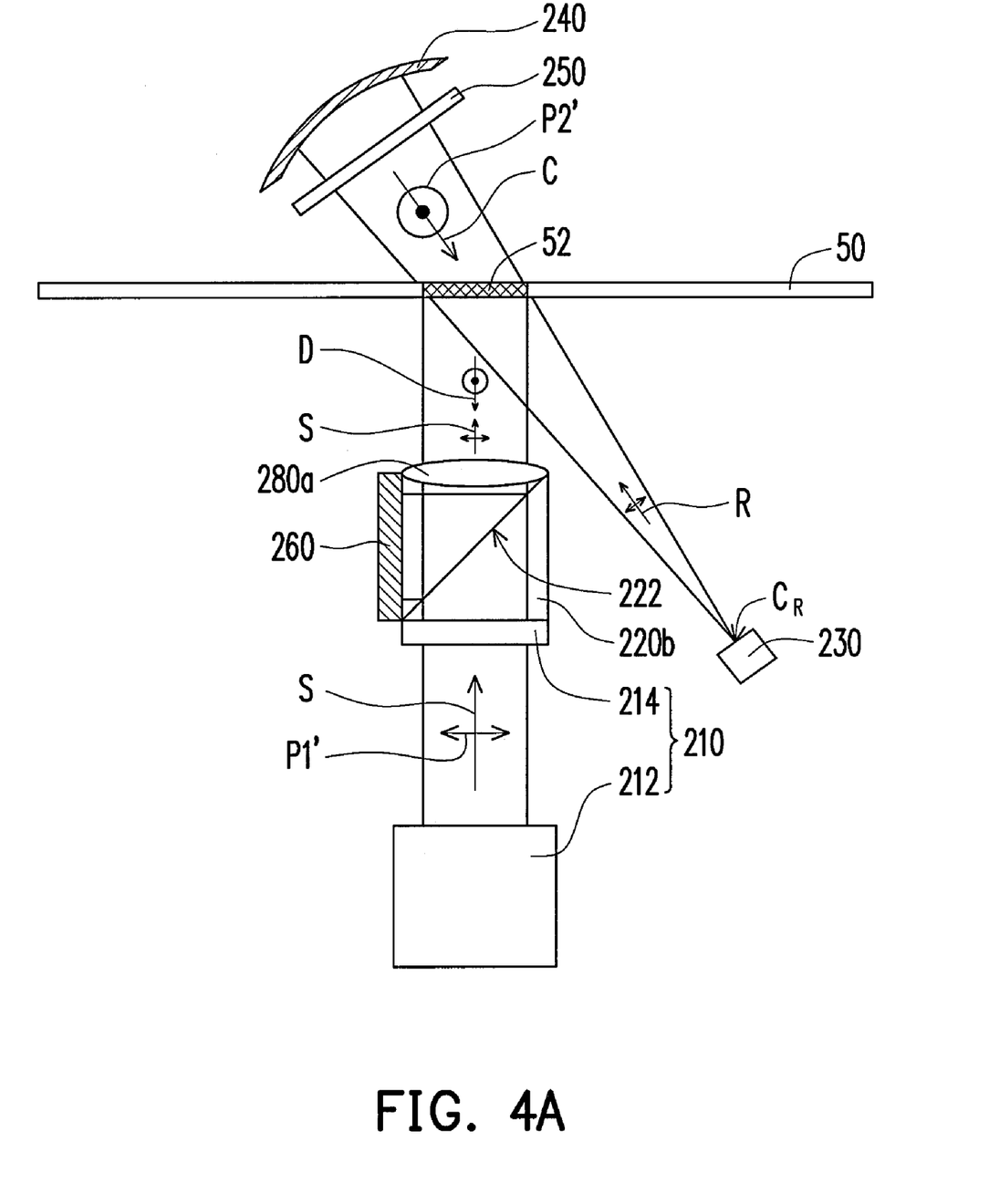
FIGS. 4A through 4F show modifications made to the hologram disc reading and writing apparatus depicted in FIG. 3.

The beam splitter 220b has a splitter surface 222. In the present embodiment, the signal light beam S having the first polarization direction P1 can be reflected to the data region 52 by the splitter surface 222, and the data light beam D having the second polarization direction P2 can pass through the splitter surface 222 and can be transmitted to the optical reading head 260. The first polarization direction P1 is substantially perpendicular to the second polarization direction P2. Specifically, the first polarization direction P1 is, for example, perpendicular to the drawing sheet of FIG. 3 while the second polarization direction P2 is, for example, parallel to the drawing sheet of FIG. 3. In another embodiment, referring to FIG. 4A, the first polarization direction P1' may be parallel to the drawing sheet, and the second polarization direction P2' may be perpendicular to the drawing sheet. The signal light beam S having the first polarization direction P1' passes through the splitter surface 222 and is transmitted to the data region 52, and the data light beam D having the second polarization P2' can be reflected to the optical reading head 260 by the splitter surface 222.

Referring to FIG. 3 again, in the present embodiment, the spherical wave light beam R can be a divergent light beam, and the reflector 240 can be a concave mirror which has a curvature center located at the divergent center $C_R$ of the spherical wave light beam R so as to reflect the spherical wave light beam R to form a phase conjugate light beam C conjugating therewith. The phase conjugate light beam C is a convergent spherical wave light beam, wherein a convergent center thereof is the divergent center $C_R$ of the spherical wave light beam R. However, in another embodiment, a reflector 240' can be combined with a lens 270 shown in FIG. 4B to replace the reflector 240 shown in FIG. 3 for generating the phase conjugate light beam C. The reflector 240' can be a flat mirror, and the lens 270 can be disposed on the transmission path of the phase conjugate light beam C and located between the reflector 240' and the data region 52.

For concentrating the energy of the signal light beam S, a lens 280a can be disposed on the transmission path of the signal light beam S between the beam splitter 220b and the data region 52 in the present embodiment. Nevertheless, a lens 280b as shown in FIG. 4C can also be disposed on the transmission path of the signal light beam S between the signal light source 212 and the spatial light modulator 214 to concentrate the energy of the signal light beam S in other embodiments, or the lens can be disposed on the above-mentioned two positions.

Referring to FIG. 3 again, in the present embodiment, the signal light source module 210 and the beam splitter 220b can be disposed at a position where the signal light beam S is substantially perpendicularly incident to the data region 52, and the reference/reading light source 230 can be disposed at a position where the spherical wave light beam R is obliquely incident to the data region 52. However, in other embodiments, such as those shown in FIGS. 4D, 4E and 4F, the signal light source module 210 and the beam splitter 220b can be disposed at a position where the signal light beam S is obliquely incident to the data region 52, and the reference/reading light source 230 can be disposed at a position where the spherical wave light beam R is substantially perpendicularly incident to the data region 52. It is noted that whether the signal light beam S or the spherical wave light beam R is perpendicularly incident to the data region 52 or obliquely incident to the data region 52 is not restricted in the present invention, and a person who has ordinary skill in the art can make the signal light beam S and the spherical wave light beam R incident to the data region 52 at any two different angles as required. Those modifications still fall within the scope of the invention.

Figure 5:
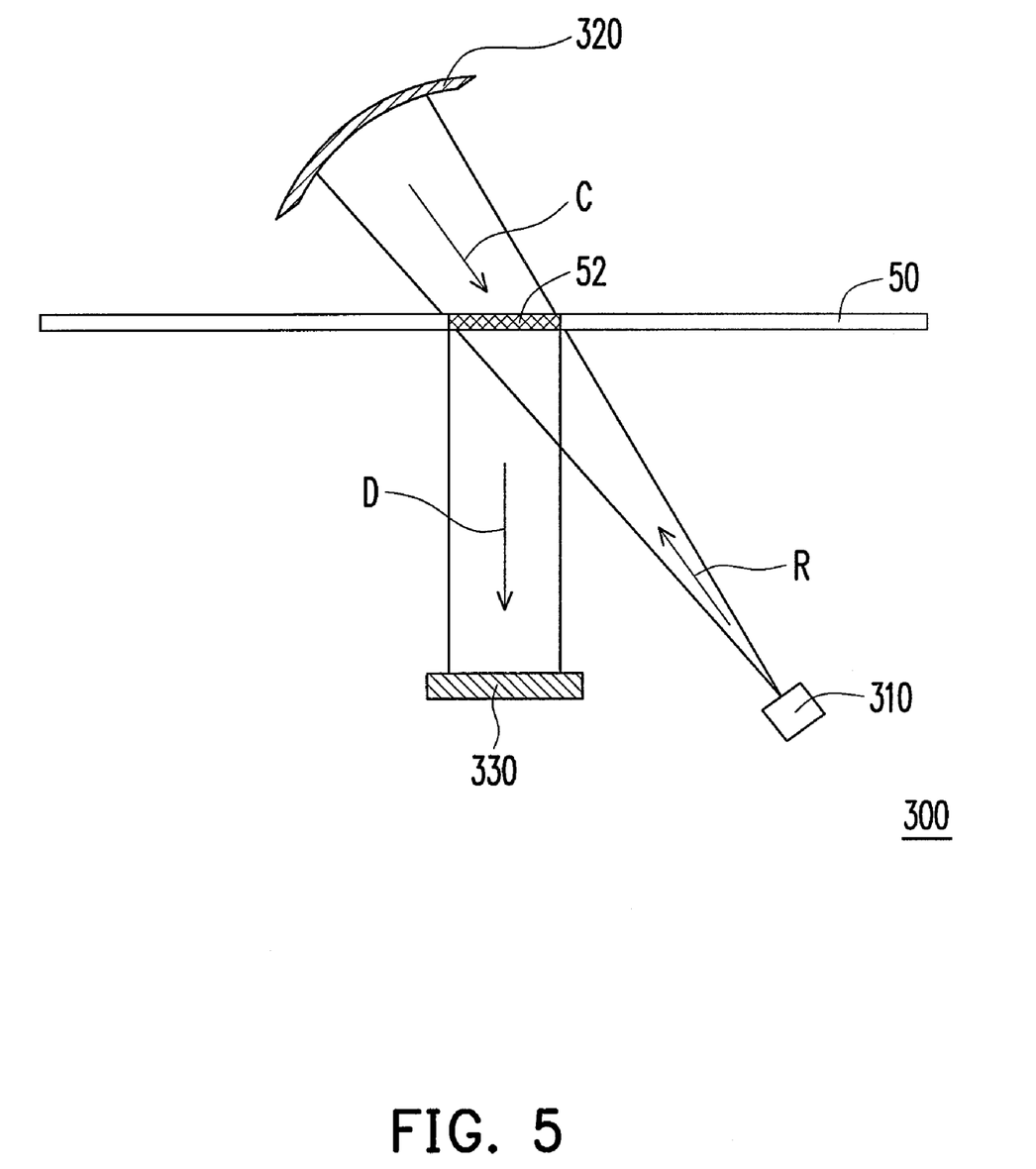
FIG. 5 is a schematic diagram of a hologram disc reading apparatus according to an embodiment of the present invention.

FIG. 5 is a schematic diagram of a hologram disc reading apparatus according to an embodiment of the present invention. Referring to FIG. 5, the hologram disc reading apparatus 300 is used for reading data on the hologram disc 50. The hologram disc reading apparatus 300 includes a reading light source 310, a reflector 320, and an optical reading head 330. The reading light source 310 and the location thereof are the same as the reference/reading light source 230 and the location thereof as illustrated in FIG. 3, and the reading light source 310 can emit the spherical wave light beam R consistent with that depicted in FIG. 3 to the data region 52 of the hologram disc 50. In addition, the reflector 320, the optical reading head 330, and the locations thereof are respectively similar to the reflector 240, the optical reading head 260, and the locations thereof as illustrated in FIG. 3. Accordingly, the reflector 320 can reflect the spherical wave light beam R to form the phase conjugate light beam C conjugating therewith, and the phase conjugate light beam C passes through the data region 52 and is then transformed into the data light beam D to be transmitted to the optical reading head 330.

The hologram disc reading apparatus 300 adopts the design combining the spherical wave shifting multiplexing and the phase conjugate light readout similar to the design of the hologram disc reading and writing apparatus 200 as shown in FIG. 2A so as to dispose the optical reading head 330 and the reading light source 310 at the same side of the hologram disc 50. The disposition manner is conducive to reduction of the volume of the hologram disc reading apparatus 300.

Figure 4B:
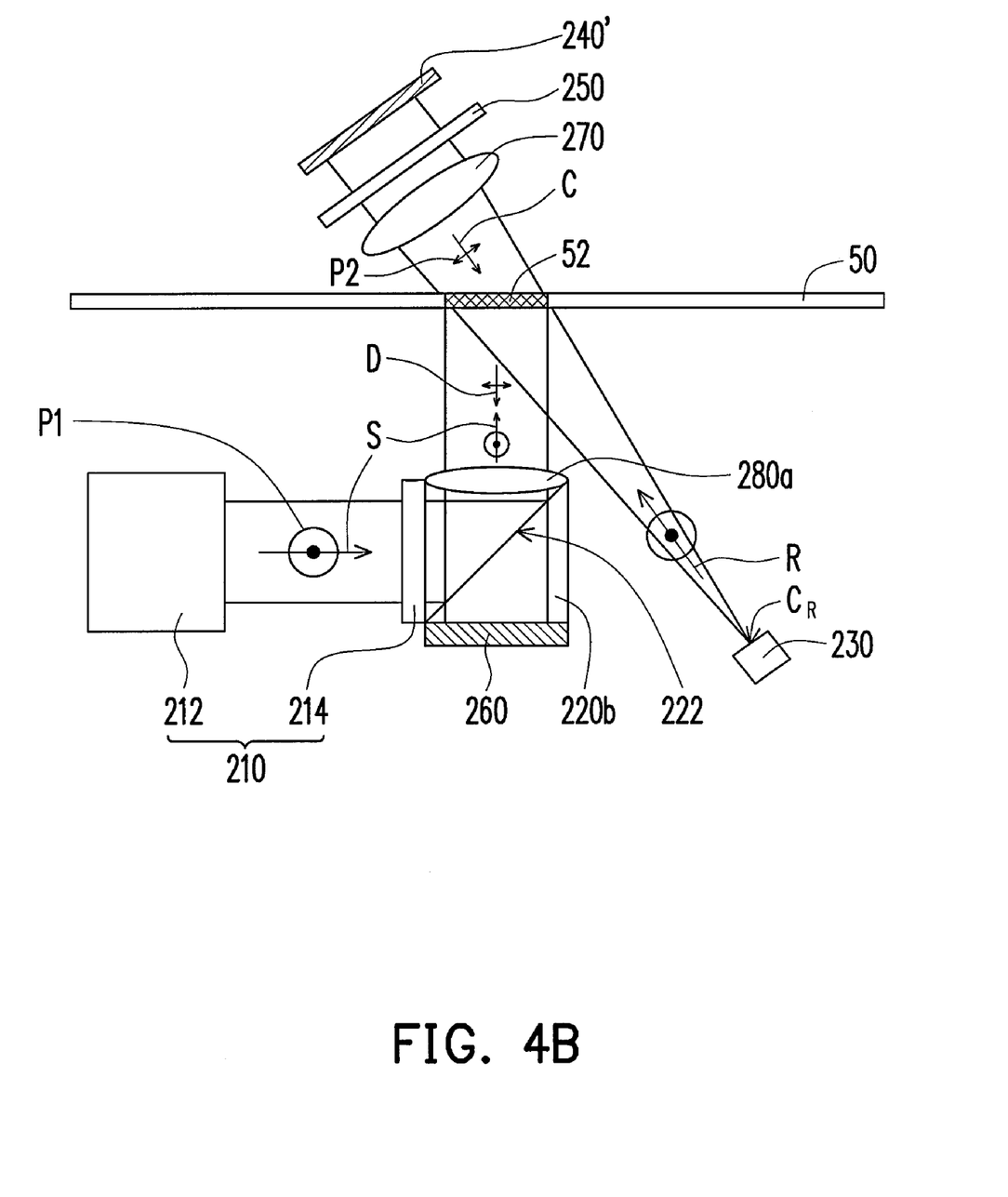
Figure 4C:
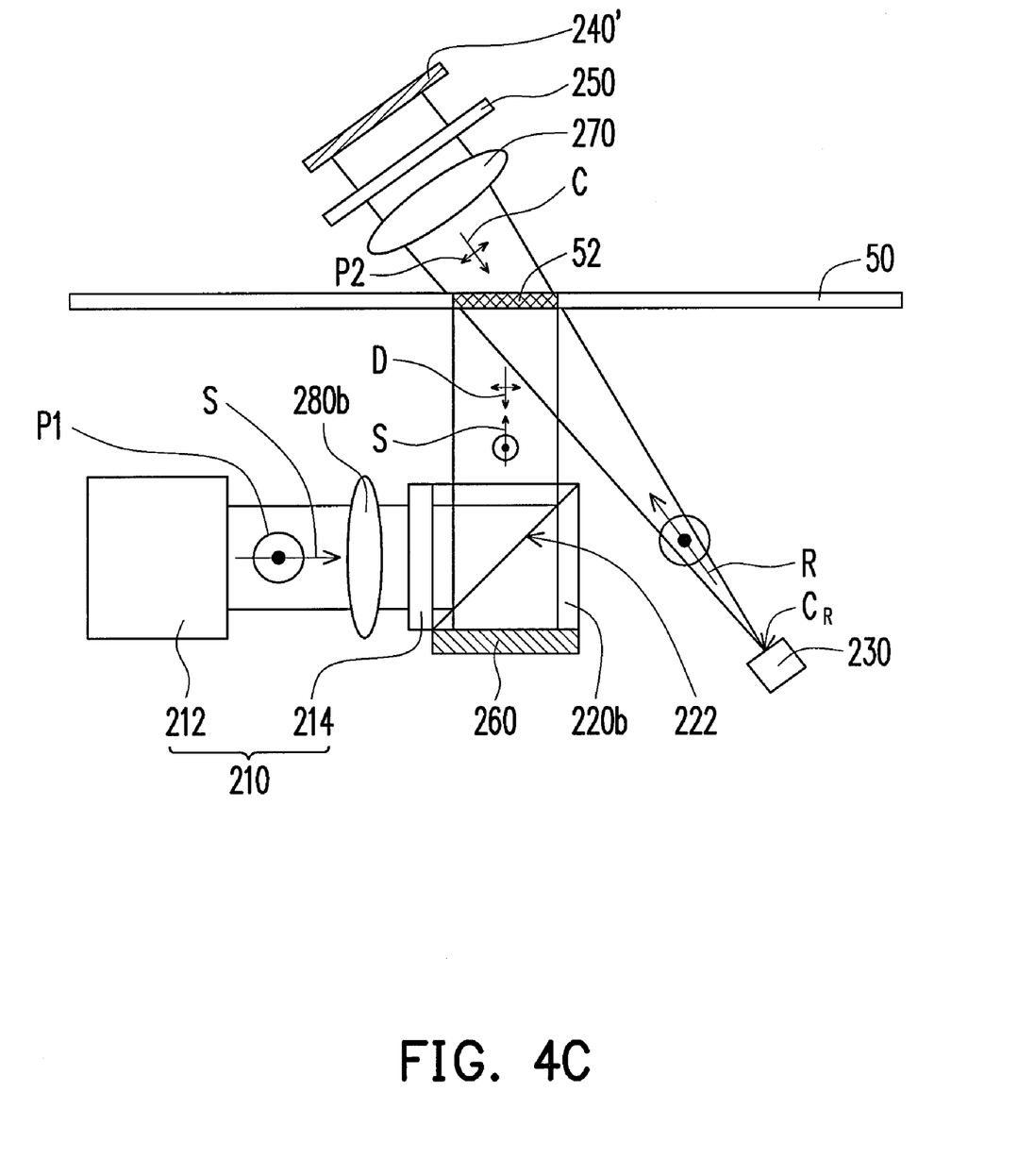
Figure 4D:
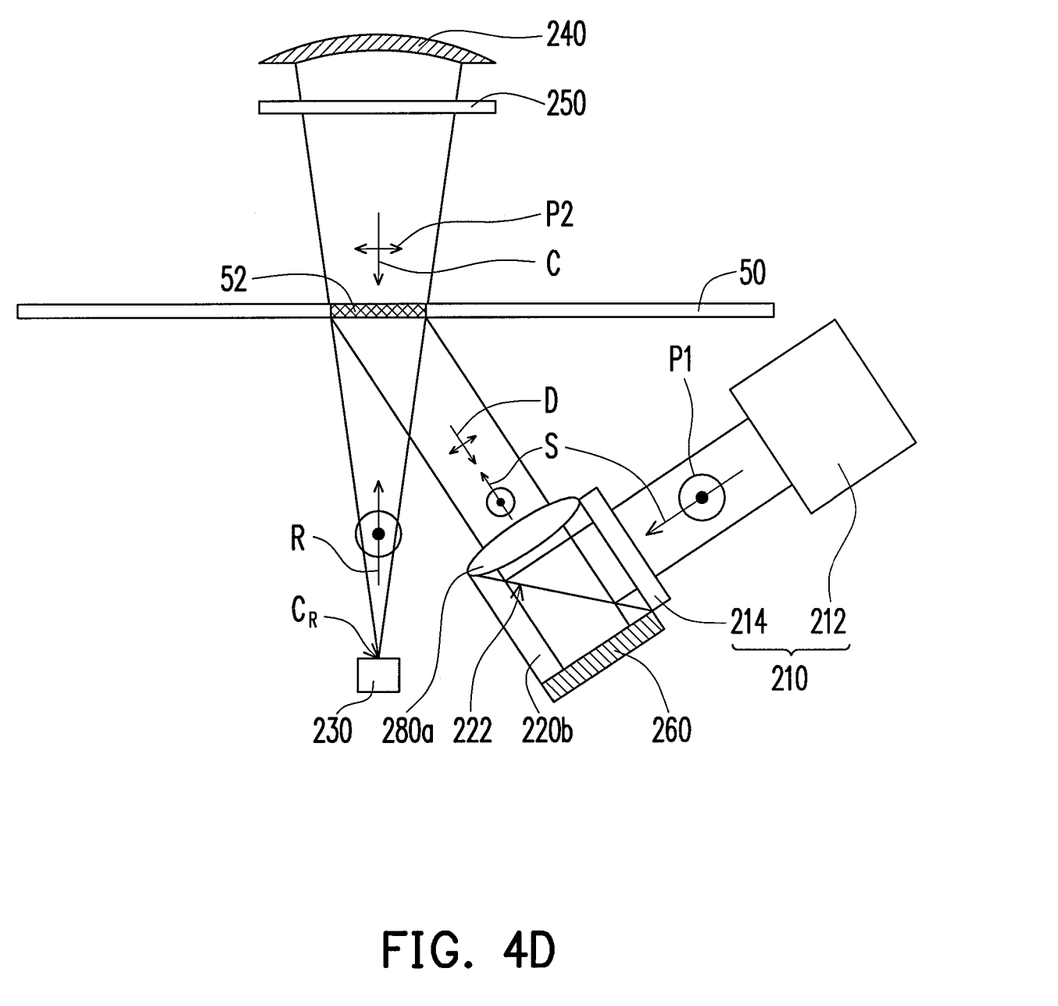
Figure 4E:
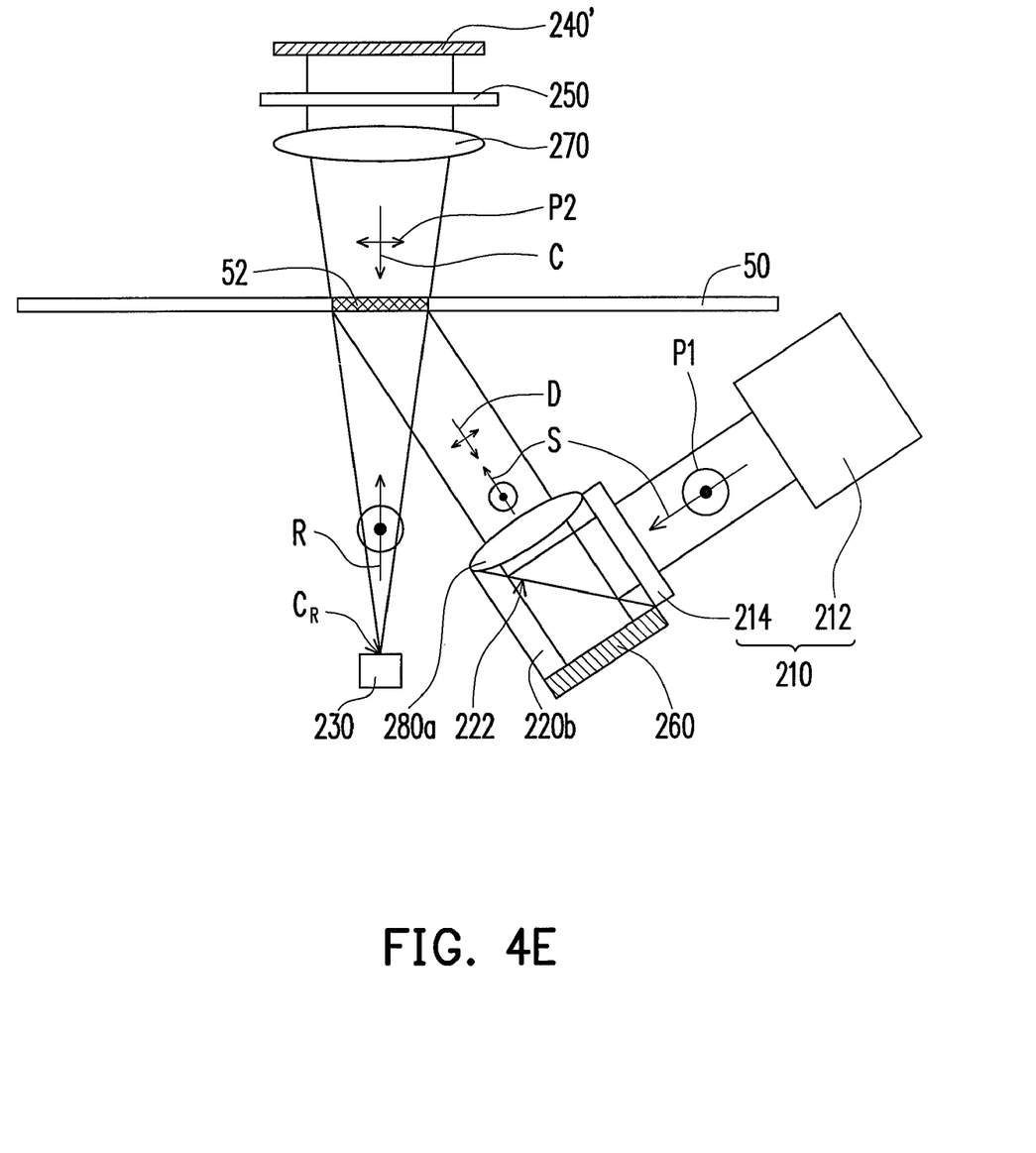
Figure 4F:
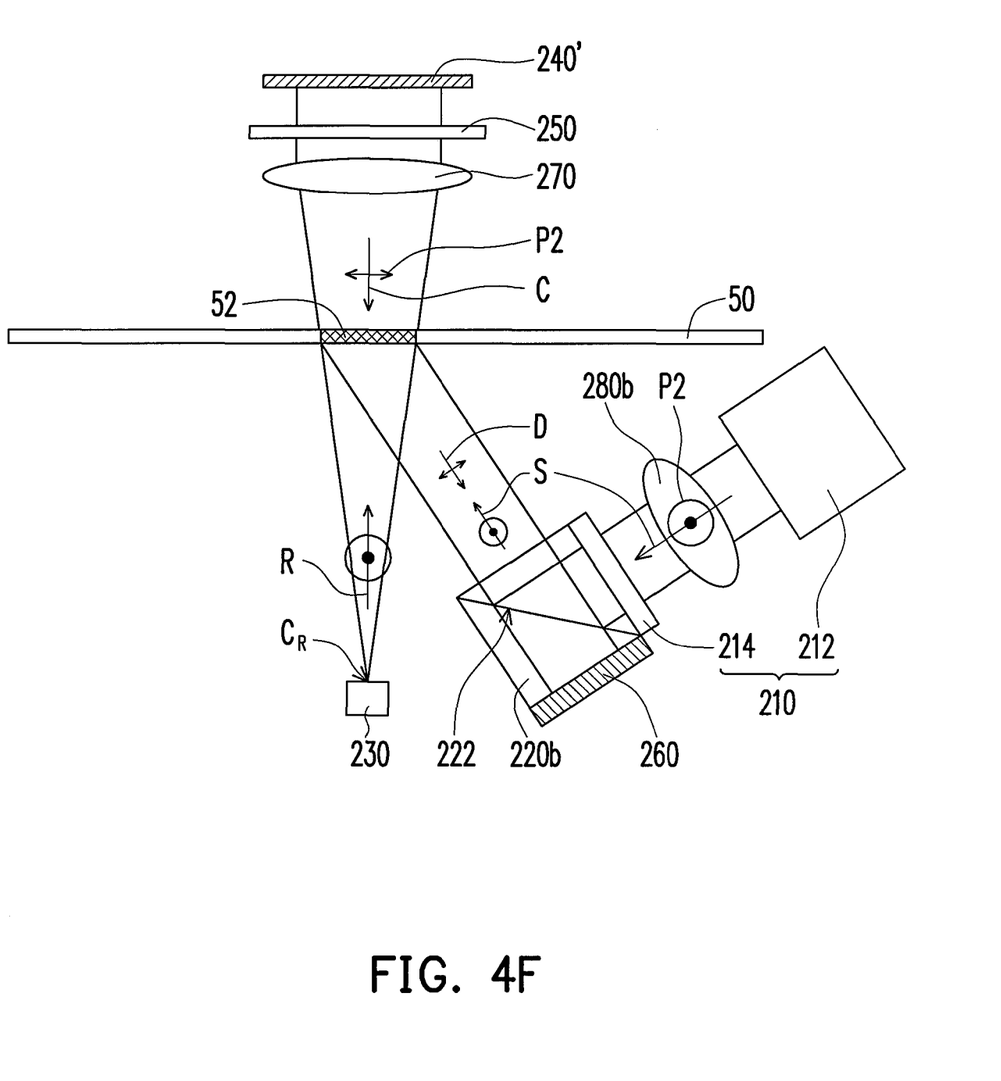
Figure 6A:
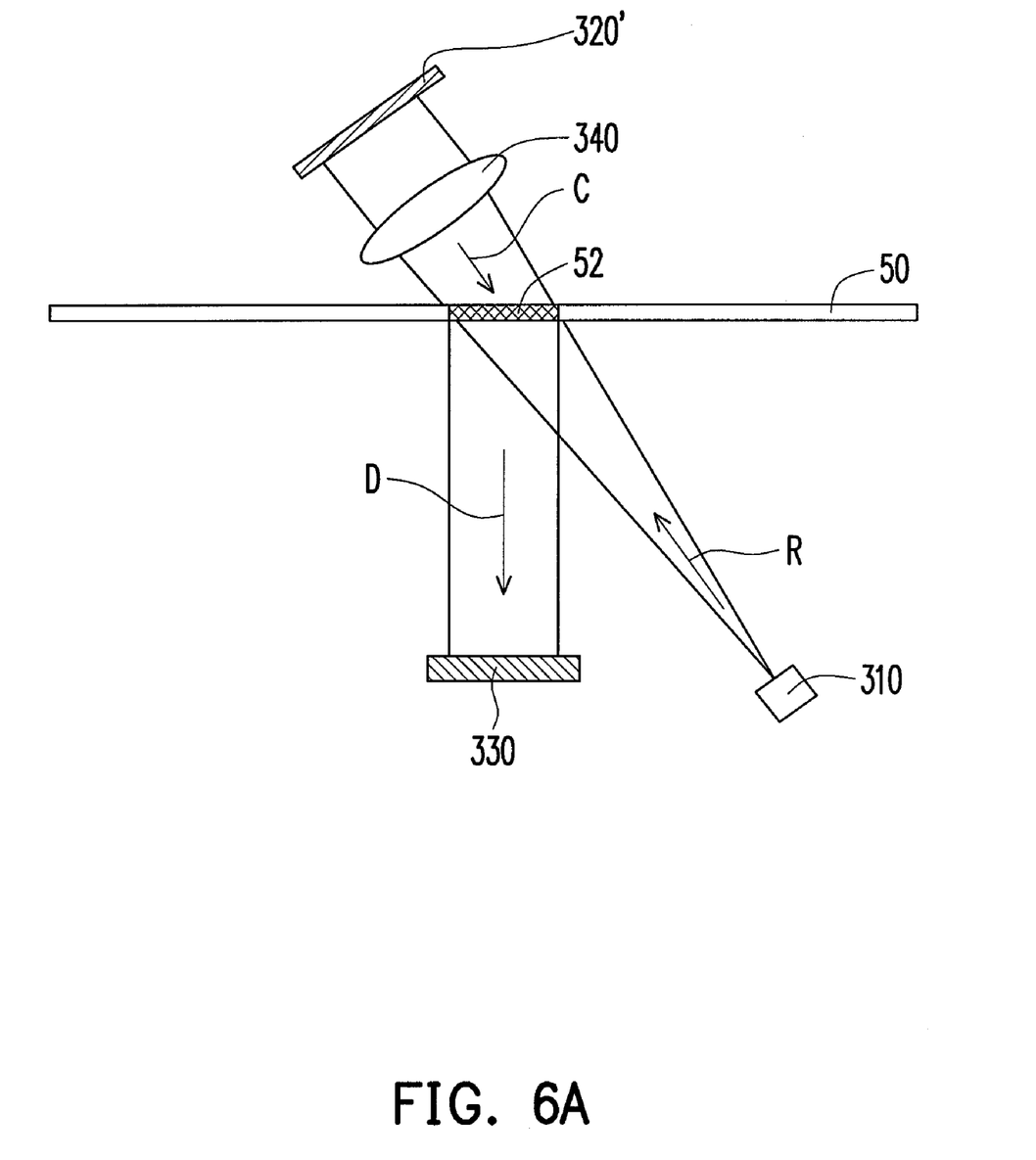
FIGS. 6A and 6B show modifications made to the hologram disc reading apparatus depicted in FIG. 5.

In another embodiment, the combination of the lens 340 and the reflector 320' shown in FIG. 6A can be used for replacing the reflector 320 shown in FIG. 5, wherein the lens 340, the reflector 320', and the locations thereof are respectively similar to the lens 270, the reflector 240', and the locations thereof as illustrated in FIG. 4B.

Figure 6B:
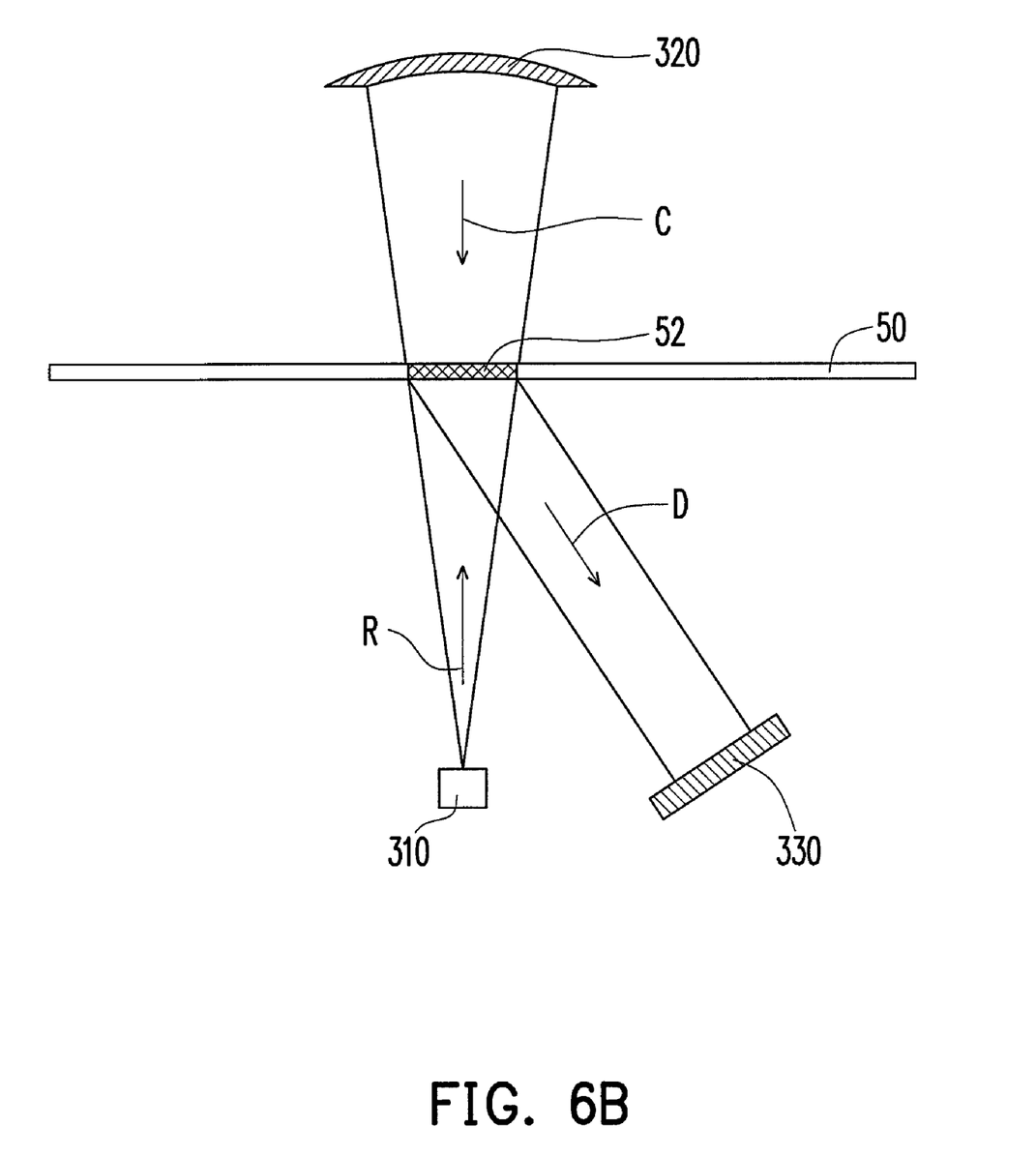

Referring to FIG. 5 again, in the present embodiment, the reading light source 310 can be disposed at a position where the spherical wave light beam R is obliquely incident to the data region 52, and the optical reading head 330 is adapted for receiving the data light beam D substantially perpendicularly emitted from the data region 52. However, in another embodiment as shown in FIG. 6B, the reading light source 310 can be disposed at a position where the spherical wave light beam R is substantially perpendicularly incident to the data region 52, and the optical reading head 330 is adapted for receiving the data light beam D obliquely emitted from the data region 52. It is noted that whether the spherical wave light beam R is obliquely incident to the data region 52 or perpendicularly incident to the data region 52 and whether the optical reading head 330 is used for receiving the data light beam D obliquely or perpendicularly emitted from the data region 52 are not restricted in the present invention, and a person has ordinary skill in the art can make the incident angle of the spherical wave light beam R and the emitting angle of the data light beam D transmitted to the optical reading head 330 be any two different angles as required. Those modifications still fall within the scope of the invention.

In view of the above, the hologram disc reading and writing apparatus and the hologram disc reading apparatus of the present invention adopt the design combining the spherical wave shifting multiplexing and the phase conjugate light readout so as to dispose the optical reading head and the light sources on the same side of the hologram disc. The disposition manner is conducive not only to reduction of the volumes of the hologram disc reading and writing apparatus and the hologram disc reading apparatus, but also to applications of the two apparatus to the portable electronic products with small volume.

Although the present invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A hologram disc reading and writing apparatus for reading and writing data on a hologram disc, the hologram disc reading and writing apparatus comprising:
   a signal light source module adapted for emitting a signal light beam to a data region of the hologram disc when writing data, the signal light beam having a first polarization direction;
   a beam splitter disposed on a transmission path of the signal light beam and located between the signal light source module and the data region, the beam splitter being adapted for transmitting the signal light beam to the data region;
   a reference/reading light source located at one side of the hologram disc where the signal light source module is located, the reference/reading light source being adapted for emitting a spherical wave light beam having the first polarization direction to the data region when writing data so as to write data onto the data region through the signal light beam and the spherical wave light beam, the reference/reading light source being adapted for emitting the spherical wave light beam to the data region when reading data, the spherical wave light beam passing through the data region;

a reflector located at the other side of the hologram disc opposite to the one side of the hologram disc where the signal light source module is located, the reflector being adapted for reflecting the spherical wave light beam to form a phase conjugate light beam conjugating with the spherical wave light beam and transmitted to the data region, the phase conjugate light beam being transmitted through the data region and then transformed to a data light beam transmitted to the beam splitter; and an optical reading head located on the one side of the hologram disc where the reference/reading light source is located, the beam splitter being adapted for transmitting the data light beam to the optical reading head.

2. The hologram disc reading and writing apparatus of claim 1, wherein the signal light source module comprises:

a signal light source for emitting the signal light beam; and a spatial light modulator disposed on the transmission path of the signal light beam for modulating the signal light beam.

3. The hologram disc reading and writing apparatus of claim 2, wherein the spatial light modulator comprises a liquid crystal panel or a digital micro-mirror device.

4. The hologram disc reading and writing apparatus of claim 2, further comprising a lens disposed on the transmission path of the signal light beam and located between the signal light source and the spatial light modulator.

5. The hologram disc reading and writing apparatus of claim 1, wherein the beam splitter has a splitter surface, the signal light beam is reflected to the data region by the beam splitter, and the data light beam passes through the splitter surface and is transmitted to the optical reading head.

6. The hologram disc reading and writing apparatus of claim 1, wherein the beam splitter has a splitter surface, the signal light beam passes through the splitter surface and is transmitted to the data region, and the data light beam is reflected to the optical reading head by the splitter surface.

7. The hologram disc reading and writing apparatus of claim 1, wherein the beam splitter is a partially-transmissive-partially-reflective mirror or a total internal reflection prism.

8. The hologram disc reading and writing apparatus of claim 1, wherein the beam splitter is a polarized beam splitter, and the hologram disc reading and writing apparatus further comprising a quarter wavelength retarder disposed in a transmission path of the phase conjugate light beam and located between the reflector and the data region, wherein the phase conjugate light beam has a second polarization direction after passing through the quarter wavelength retarder, and the data light beam also has the second polarization direction.

9. The hologram disc reading and writing apparatus of claim 8, wherein the first polarization direction is substantially perpendicular to the second polarization direction.

10. The hologram disc reading and writing apparatus of claim 1, wherein the signal light beam is coherent with the spherical wave light beam.

11. The hologram disc reading and writing apparatus of claim 1, wherein the spherical wave light beam is a divergent light beam.

12. The hologram disc reading and writing apparatus of claim 1, wherein the signal light source module and the beam splitter are disposed at a position where the signal light beam is substantially perpendicularly incident to the data region, and the reference/reading light source is disposed at a position where the spherical wave light beam is obliquely incident to the data region.

13. The hologram disc reading and writing apparatus of claim 1, wherein the signal light source module and the beam splitter are disposed at a position where the signal light beam is obliquely incident to the data region, and the reference/reading light source is disposed at a position where the spherical wave light beam is substantially perpendicularly incident to the data region.

14. The hologram disc reading and writing apparatus of claim 1, wherein the reflector is a concave mirror having a curvature center located at a divergent center of the spherical wave light beam.

15. The hologram disc reading and writing apparatus of claim 1, further comprising a lens disposed on a transmission path of the phase conjugate light beam and located between the reflector and the data region.

16. The hologram disc reading and writing apparatus of claim 15, wherein the reflector is a flat mirror.

17. The hologram disc reading and writing apparatus of claim 1, further comprising a lens disposed on the transmission path of the signal light beam and located between the beam splitter and the data region.

18. The hologram disc reading and writing apparatus of claim 1, wherein the optical reading head comprises a charge coupled device or a complementary metal-oxide-semiconductor sensor for transforming the data light beam into an electric signal.

19. A hologram disc reading apparatus for reading data on a hologram disc, the hologram disc reading apparatus comprising:

a reading light source adapted for emitting a spherical wave light beam to a data region of the hologram disc, the spherical wave light beam being a polarized light beam and passing through the data region;

a reflector, wherein the reflector and the reading light source are respectively located at two opposite sides of the hologram disc, the reflector is adapted for reflecting the spherical wave light beam to form a phase conjugate light beam transmitted to the data region, and the phase conjugate light beam is transmitted through the data region and transformed to a data light beam; and an optical reading head, wherein the optical reading head and the reading light source are located at the same side of the hologram disc, and the optical reading head is used for receiving the data light beam.

20. The hologram disc reading apparatus of claim 19, wherein the spherical wave light beam is a divergent light beam.

21. The hologram disc reading apparatus of claim 19, wherein the reading light source is disposed at a position where the spherical wave light beam is obliquely incident to the data region, and the optical reading head is adapted for receiving the data light beam substantially perpendicularly emitted from the data region.

22. The hologram disc reading apparatus of claim 19, wherein the reading light source is disposed at a position where the spherical wave light beam is substantially perpendicularly incident to the data region, and the optical reading head is adapted for receiving the data light beam obliquely emitted from the data region.

23. The hologram disc reading apparatus of claim 19, wherein the reflector is a concave mirror which has a curvature center located at a divergent center of the spherical wave light beam.

24. The hologram disc reading apparatus of claim 19, further comprising a lens disposed on a transmission path of the phase conjugate light beam and located between the reflector and the data region.

25. The hologram disc reading apparatus of claim 24, wherein the reflector is a flat mirror.

26. The hologram disc reading apparatus of claim 19, wherein the optical reading head comprises a charge coupled device or a complementary metal-oxide-semiconductor sensor for transforming the data light beam into an electric signal.

* * * * *